Nov. 9, 1965

B. H. HAMILTON 3,217,232

REGULATED POWER SUPPLY

Filed Oct. 30, 1961

INVENTOR
B. H. HAMILTON
BY
Roy M. Porter Jr.
ATTORNEY

Nov. 9, 1965  B. H. HAMILTON  3,217,232
REGULATED POWER SUPPLY
Filed Oct. 30, 1961  3 Sheets-Sheet 2

INVENTOR
B. H. HAMILTON
BY
ATTORNEY

Nov. 9, 1965  B. H. HAMILTON  3,217,232
REGULATED POWER SUPPLY
Filed Oct. 30, 1961  3 Sheets-Sheet 3

INVENTOR
B. H. HAMILTON
BY
ATTORNEY

United States Patent Office 3,217,232
Patented Nov. 9, 1965

3,217,232
REGULATED POWER SUPPLY
Billy H. Hamilton, Summit, N.J., assignor to Bell Telephone Laboratories, Incorporated, New York, N.Y., a corporation of New York
Filed Oct. 30, 1961, Ser. No. 148,451
5 Claims. (Cl. 321—18)

This invention relates to current and voltage regulation and, more particularly, to an improvement in transistor regulated, direct-current power supplies.

A well-known technique for regulating the magnitude of voltage applied to a load from a source of direct-current energy involves the use of a variable impedance element interposed in series between the source and the load. In practice, a control stage responsive to changes in the magnitude of load voltage is employed for adjusting the voltage drop across the impedance element such that the load voltage is held at a substantially constant value. In such an arrangement, variations in the voltage at the terminals of the source are canceled by equal variations in the voltage drop across the regulating impedance.

Although a vacuum tube may be effectively employed as a series regulator, the transistor, due to its small size and rugged dependability, is usually preferred. Recent advances in the state of the semiconductor art, particularly the increased power handling capability of such devices, have made the application of transistors in series regulators even more advantageous. Nonetheless, it continues to be desirable that the power loss in the regulating, series transistor be minimized in order to obtain maximum efficiency and to reduce the operating temperature of the regulator.

Accordingly, it is a principal object of the present invention to decrease the power dissipation of a series transistor employed in a regulated power supply.

It is a further and more particular object of the present invention to protect the regulating transistor from the damaging effects which would otherwise result from the large current flow existing, for example, whenever the load is inadvertently short-circuited.

Another object of the invention is to improve the output voltage regulation characteristics of a series-regulated power supply.

A still further object of the invention is to reduce the current requirements of the control stage preceding the regulating transistor.

In accordance with a feature of the present invention, a variable bias-voltage generator is employed for increasing the forward-biasing base current to the regulating transistor in proportion to load current, thereby assuring the saturation of the transistor for high currents outside the normal operating range. The invention is particularly adapted for use with a ferro-resonant transformer interposed between a source of alternating-current energy and the transistor regulator. In this arrangement, the linear inductance of the ferro-resonant device is provided with an additional winding. The voltage developed at the terminals of this winding is proportional to load current and, consequently, may be rectified and filtered to provide the direct-current base drive in accordance with the invention.

A more detailed understanding of the invention may be obtained from the following detailed description when taken with the drawings in which.

In the drawings like reference numerals have been used to designate those components whose function is the same in each of the figures.

Figure 1:
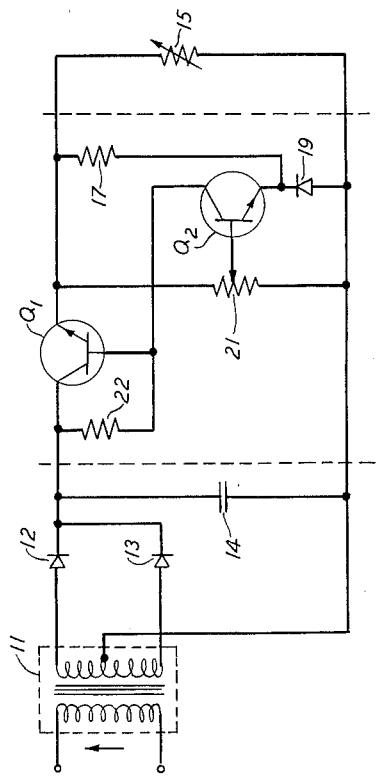
FIG. 1 is a schematic diagram of a typical series transistor regulated power supply of a type well known in the prior art.

FIG. 1 of the drawings illustrates a circuit which is typical of those transistorized regulators which have been successfully employed in the past. The features, advantages and operation of the regulator shown in FIG. 1 are discussed in detail in U.S. Patent 2,693,568 which issued to F. H. Chase on November 2, 1954; consequently, a thorough discussion of this circuit will not be repeated here. In order to fully appreciate the present invention, however, it will be helpful to point out certain operating difficulties inherent in this type of prior art regulator. As an additional aid in understanding the advantages provided by the present invention, a graph of the operating characteristics of the prior art circuit is shown in FIG. 2 of the drawings.

As shown in FIG. 1 alternating-current energy from an available source is applied to the primary winding of power transformer 11. Transformer 11 is provided with a center tapped secondary winding which is interconnected with diodes 12 and 13 and a filter capacitor 14 in a common full-wave rectifier configuration. The diodes 12 and 13 are poled in the direction of positive current flow away from the secondary winding of transformer 11, such that a positive voltage is delivered to the collector electrode of transistor $Q_1$. The emitter of transistor $Q_1$ is directly connected to one side of a load resistance 15, the other side of load resistance 15 being directly connected to the center taped connection of transformer 11. In this manner, a direct-current voltage is applied to the load resistance 15. A resistance 17 serially connected with a Zener diode 19 across load resistance 15 provides a reference voltage at the juncture of diode 19 and resistance 17. The emitter electrode of a transistor $Q_2$ is connected to this reference voltage source and its base electrode is connected to the movable tap of voltage dividing resistance 21. Resistance 21 is also connected in parallel with load resistance 15. The collector electrode of transistor $Q_2$ is connected to the base electrode of transistor $Q_1$ and a resistance 22 connects the base and collector electrodes of transistor $Q_1$.

The circuit shown in FIG. 1 is capable of delivering a substantially constant output voltage to the load resistance 15. During normal operation, transistor $Q_2$ will be in conduction since the voltage at its base electrode will be at a somewhat higher potential than the reference voltage at its emitter electrode. Current will flow, therefore, from the positive direct-current voltage at the collector of transistor $Q_1$ through resistance 22, the collector-emitter path of transistor $Q_2$, and the Zener diode 19. It should be noted that resistance 22 also provides forward-biasing current for transistor $Q_1$. It should also be recognized that the more highly conductive the state of transistor $Q_2$ the less forward bias will be applied to the base electrode of transistor $Q_1$. If the voltage across load resistance 15 should drop, for instance, the voltage delivered to the base electrode of transistor $Q_2$ will also drop. Since the reference voltage at the emitter electrode of transistor $Q_2$ remains constant, the impedance of the collector-emitter path of transistor $Q_2$ will increase. This increase in impedance raises the potential at the base electrode of transistor $Q_1$ thereby decreasing the impedance of the collector-emitter path of transistor $Q_1$. This decrease in impedance of the regulating transistor $Q_1$ decreases the voltage drop across $Q_1$ and, consequently, raises the voltage across the load resistance 15 in order to compensate for the original voltage drop.

Figure 2:
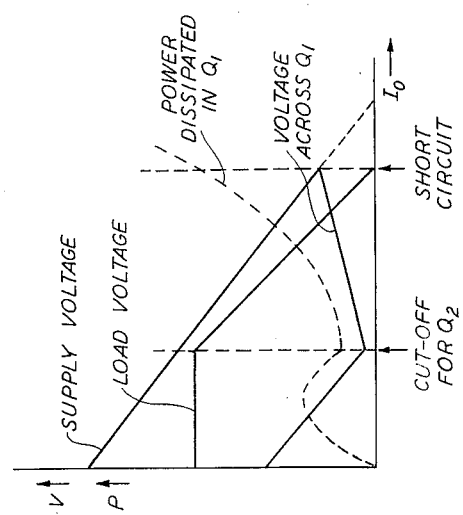
FIG. 2 is a graph of the operating characteristics of the prior art circuit illustrated in FIG. 1.

The operation of the circuit shown in FIG. 1 may be more fully understood by considering the graph shown in FIG. 2 of the drawings. When the impedance of load resistance 15 is decreased the load current, $I_0$, increases. Due to the internal impedance of the supply voltage source the increase in load current causes a linear decrease in the supply voltage (the term "supply voltage" as used herein refers to the voltage existing across the filter capacitor 14). In order to provide a constant load voltage for various load impedances the voltage across transistor $Q_1$ is subtracted from the magnitude of the supply voltage. For very small load currents the voltage across transistor $Q_1$ is relatively large. As the load current increases, however, the decrease in the magnitude of the supply voltage is accompanied by a similar decrease in the magnitude of the voltage across transistor $Q_1$, thereby holding the load voltage substantially constant. As the impedance of load resistance 15 is decreased to a particular critical value, transistor $Q_2$ "cuts off" and the operating range of the regulator is terminated. As the load resistance decreases still further, the load current $I_0$ continues to increase as does the voltage across transistor $Q_1$. This results from the fact that the transistor $Q_1$, being biased only by resistance 22, exhibits a voltage drop which is proportional to the load current. Since the power dissipated in the transistor $Q_1$ is equal to the product of the voltage across $Q_1$ and the load current, the power loss in $Q_1$ increases quadratically after the cut-off of transistor $Q_2$. As can be seen in FIG. 2 of the drawings, the power dissipated in transistor $Q_2$ rises to a value considerably above the maximum power loss in the normal operating range. If the output terminals of the regulated power supply were to be inadvertently short-circuited, this power dissipation might be sufficient to damage the regulating transistor.

Figure 3:
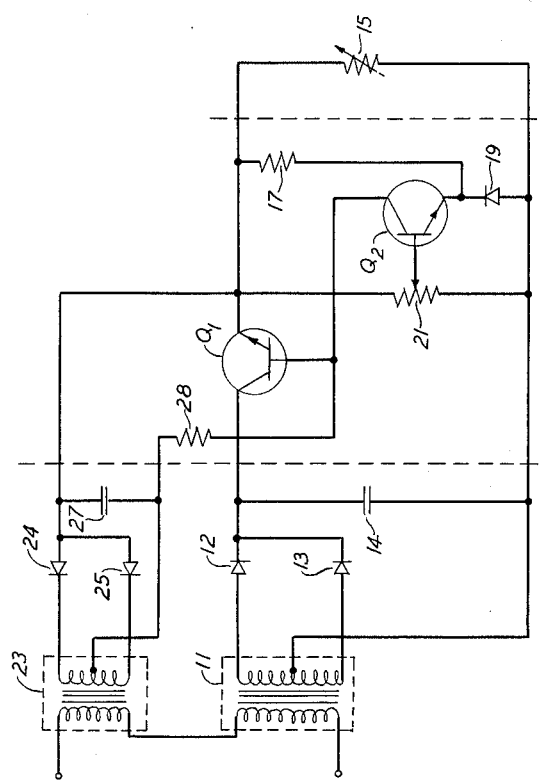
FIG. 3 is a schematic diagram of an improved, transistor regulated power supply of the type contemplated by the present invention.

FIG. 3 of the drawings illustrates an improved regulator embodying the features of the present invention. As can be seen by a comparison of FIG. 1 and FIG. 3, the primary winding of an additional transformer 23 is connected in series with the primary winding of the power transformer 11. The power transformer 23 is provided with a center tapped secondary winding which is connected to a full-wave rectifier circuit comprising diodes 24 and 25 and a filter capacitor 27 arranged in a well-known configuration. Diodes 24 and 25 are poled in the direction of positive current flow toward the secondary winding such that a negative voltage is applied to the upper terminal of capacitor 27. The center tap of the secondary winding of transformer 23 is connected to the base electrode of transistor $Q_1$ by means of resistance 28. The negative terminal of capacitor 27 is directly connected to the emitter electrode of transistor $Q_1$. In other respects the circuit of FIG. 3 is identical to the arrangement shown in FIG. 1.

Figure 4:
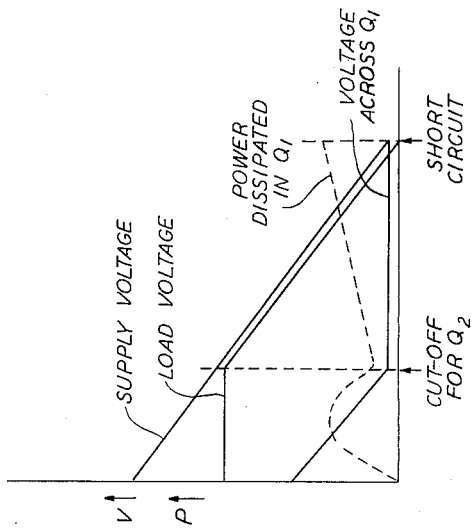
FIG. 4 is a graph of the operating characteristics of the improved regulator illustrated in FIG. 3.

Since the magnitude of the alternating current flowing in the primary windings of transformers 11 and 23 is proportional to the current flowing through load resistance 15, a direct-current voltage is developed across capacitor 27 whose magnitude is also proportional to the magnitude of the load current. As can be seen by referring to the graph of FIG. 4, the operating characteristics of the circuit in FIG. 3 are somewhat similar to those of the prior art circuit shown in FIG. 1 within the normal operating range. After transistor $Q_2$ cuts off, however, the effects of increasing load current are quite different in the improved regulator as contemplated by the present invention. Since the voltage across capacitor 27 increases with increasing load current, the base electrode of transistor $Q_1$ is provided with an ever increasing bias voltage. This bias voltage insures that transistor $Q_1$ will remain "saturated" and, consequently, that the voltage drop across transistor $Q_1$ will remain small. After transistor $Q_2$ cuts off, increasing load current results in a linear increase in the power dissipation of transistor $Q_1$. In this embodiment of the invention, the maximum power dissipation of transistor $Q_1$ with the load short-circuited is only slightly greater than the maximum power dissipation in the normal operating range. Should the output terminals of the regulated power supply become inadvertently short-circuited, therefore, transistor $Q_1$ (since it has been biased to saturation) will be protected from the large collector-emitter current which might otherwise damage the transistor.

It should also be noted that the auxiliary bias voltage for transistor $Q_1$ which is generated across filter capacitor 27 relieves a portion of the regulating burden from the control transistor $Q_2$. This may be more fully appreciated by realizing that the operation of the auxiliary bias supply and the operation of the control transistor $Q_2$ constructively co-act to provide increased forward bias to the transistor $Q_1$ for increasing load currents. Due to the "first-order load compensation" provided by the auxiliary biasing supply, the current handling requirements for the control stage are less stringent. This results in increased economy since the components of the control stage are not required to handle large amounts of power. In addition, higher performance is obtained since the load compensation assists in holding the output voltage constant against load current changes.

Figure 5:
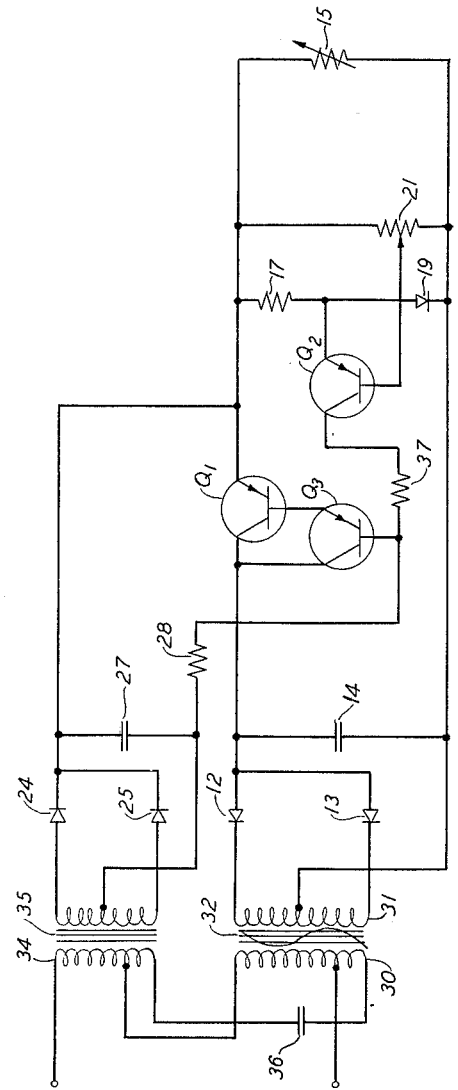
FIG. 5 is a schematic diagram of an improved regulator which employs a ferro-resonant transformer and which embodies the features of the present invention.

The embodiment of the invention pictured in FIG. 5 of the drawings employs a ferro-resonant transformer modified to produce the auxiliary biasing voltage contemplated by the invention. The ferro-resonant transformer consists of a primary winding 30 which along with a secondary winding 31 is wound on a saturating core 32 and an additional winding 34 wound on a core 35. Core 35 is constructed with a large air-gap to insure an inductance which is substantially linear over the range of magnetomotive force encountered in circuit operation. Core 32 is characterized by a rectangular hysteresis loop. Primary winding 30 is provided with an additional tap which forms one of the two alternating-current input terminals. A capacitor 36 is connected from one side of winding 30 to one side of winding 34 while the other side of winding 30 is connected to a tap on winding 34. The free end of winding 34 provides the other alternating-current input terminal. Winding 31 is a center tap secondary winding which is connected as before to diodes 12 and 13 and a filter capacitor 14 to provide a full-wave direct-current rectifier. In the embodiment of FIG. 5 the diodes 12 and 13 are poled in the direction of positive current flow toward the secondary winding such that a negative voltage is applied to the collector electrode of transistor $Q_1$. This polarity inversion allows the use of a p-n-p transistor as a series regulator rather than the n-p-n device used in the embodiment of FIG. 3. Similarly, the polarity of the Zener diode 19 has been reversed in this embodiment to provide an appropriate reference voltage for the p-n-p transistor $Q_2$. In FIG. 5 an additional stage of amplification which comprises transistor $Q_3$ and resistance 37 is also added. The emitter collector of transistor $Q_3$ is connected to the base electrode of transistor $Q_1$, the collector electrode of transistor $Q_3$ is connected to the collector electrode of transistor $Q_1$, and the base electrode of transistor $Q_3$ is connected by means of resistance 37 to the collector electrode of transistor $Q_2$. The voltage supplied by the auxiliary bias supply is applied through resistance 28 to the base electrode of transistor $Q_3$.

The present invention is particularly adapted for use with a ferro-resonant transformer since the linear inductance 34 is readily available as a primary winding for the auxiliary bias power supply. Furthermore, there are other advantages which directly result in the use of a ferro-resonant device in conjunction with a transistorized voltage regulator of the type described. The ferro-resonant regulator is capable of delivering a substantially constant alternating-current voltage to a terminal of winding 31 even though the magnitude of the alternating-current voltage supplied from the source may exhibit substantial variations.

In operation the circuit shown in FIG. 5 delivers a substantially constant direct-current voltage across capacitor 14 and a voltage across capacitor 27 which is proportional to the load resistance 15. A decrease in the impedance of load resistance 15 causes an increase in load current and a decrease in the forward biasing voltage to the base electrode of transistor $Q_2$ since the emitter electrode of transistor $Q_2$ is held at a substantially constant reference voltage by the action of Zener diode 19. The decrease in load impedance causes an increase in the impedance of the collector path of transistor $Q_2$. This increase in impedance increases the forward bias to transistor $Q_3$ which, in consequence, increases the forward bias of transistor $Q_1$. At the same time, the increase in load current generates a corresponding increase in the positive potential applied to the base electrode of transistor $Q_3$ from resistance 28. As before, the control network, which in this case comprises transistors $Q_1$ and $Q_3$ and their associated circuitry, coacts with the auxiliary bias supply to regulate the magnitude of voltage delivered to the load resistance 15.

Figure 6:
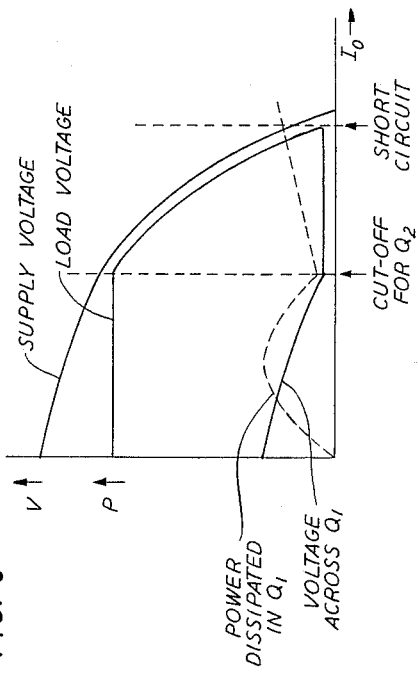
FIG. 6 is a graph of the operating characteristics of the embodiment of the invention illustrated in FIG. 5.

As shown in FIG. 6 of the drawings, the operating characteristics of the invention when provided with a ferro-resonant regulator are somewhat different than those of the embodiment discussed earlier. A principal distinction resides in the fact that the supply voltage does not decrease linearly as the load current increases. In this regard, it is of particular importance that the voltage delivered by the ferro-resonant regulator decreases much more rapidly than before in the large current range. This characteristic provides a substantial decrease in the short-circuit load current thereby further assuring the minimization of the short-circuit power dissipation in the regulating transistor.

Since the supply voltage from a ferro-resonant device is much less sensitive to fluctuations in the alternating-current line voltage, the series regulator may be designed such that the voltage cross the transistor is minimized during normal operation. Accordingly, it is possible to decrease the maximum power dissipated in the regulating transistor during the normal operating range. This is particularly significant in view of the fact that the power handling requirements for the regulating transistor will be, to a large extent, dictated by the "normal" dissipation rather than by the smaller short-circuit dissipation provided by the invention.

It is, of course, to be understood that the above-described arrangements are illustrative of the application of the principles of the invention. Numerous other arrangements may be devised by those skilled in the art without departing from the spirit and scope of the invention.

What is claimed is:

1. A voltage regulated power supply which comprises, in combination, a source of a unidirectional potential, a transistor having a base electrode and a collector-emitter path, a load, circuit means connecting said load and said collector-emitter path in series across said source, means for generating a control voltage whose magnitude varies in proportion to changes in the magnitude of current flowing through said load whenever the impedance of said load is altered, a fixed resistance and a variable impedance element connected in series to form a voltage divider, circuit means for applying said control voltage across said voltage divider, circuit means connecting said base electrode of said transistor to the juncture of said fixed resistance and said variable impedance element, and means for altering the impedance of said variable impedance element in response to changes in the magnitude of the voltage existing across said load.

2. A combination as set forth in claim 1 wherein said source of said unidirectional potential comprises, in combination, a source of alternating-current energy, a rectifier, and ferro-resonant regulating apparatus connected between said source of alternating-current energy and said rectifier whereby the magnitude of the unidirectional potential delivered by said rectifier is substantially independent of variations in the magnitude of said alternating-current energy.

3. A voltage regulated power supply which comprises, in combination, a single-phase source of alternating-current energy, first and second transformers each having a primary and a secondary winding, the primary windings of said first and said second transformers being connected in series across said source of alternating-current energy, first and second rectifiers connected to the secondary windings of said first and second transformers respectively, said first rectifier delivering a first direct-current output voltage and said second rectifier delivering a second direct-current output voltage, a transistor having a base electrode and a collector-emitter path, a load, first circuit means connecting said load and said collector-emitter path in series across said first direct-current voltage, a fixed resistance and a variable impedance element connected in series to form a voltage divider, second circuit means for applying said second direct-current voltage across said voltage divider, means for altering the impedance of said variable impedance element in response to changes in the magnitude of the voltage existing across said load, and means for applying the voltage at the juncture of said fixed resistance and said variable impedance to the base electrode of said transistor.

4. A combination as set forth in claim 3 wherein said first transformer is provided with a core characterized by a rectangular hysteresis loop, the primary winding of said second transformer is a linear inductor, and the primary winding of said first transformer is provided with a capacitor interconnected therein to form a ferro-resonant regulator whereby the magnitude of said first direct-current voltage is substantially independent of the magnitude of said alternating-current energy.

5. A combination as set forth in claim 3 wherein said variable impedance element is a transistor.

References Cited by the Examiner

UNITED STATES PATENTS

| 2,751,549 | 6/56 | Chase | 323—22 |
| 2,976,475 | 3/61 | Dodge | 323—22 |
| 2,984,779 | 5/61 | Klees | 323—22 |
| 2,992,385 | 7/61 | Lingle | 323—22 |
| 3,041,523 | 6/62 | Kuba | 321—16 |
| 3,080,516 | 3/63 | Bixly et al. | 323—22 |

LLOYD McCOLLUM, *Primary Examiner.*